United States Patent [19]

Plegat

[11] 4,071,181
[45] Jan. 31, 1978

[54] APPARATUS FOR BRAZING END PLATES AND THE LIKE

[75] Inventor: Alain Edouard Plegat, Asnieres, France

[73] Assignee: Societe Anonyme des Usines Chausson, Asnieres, France

[21] Appl. No.: 622,646

[22] Filed: Oct. 15, 1975

[30] Foreign Application Priority Data

Nov. 20, 1974 France .............................. 74 38194

[51] Int. Cl.² .................... B23K 31/02; F28F 9/16
[52] U.S. Cl. ................................. 228/43; 228/47; 228/183; 228/261
[58] Field of Search ............... 228/43, 5.1, 57, 18, 228/178, 182, 183, 208, 209, 210, 207, 261

[56] References Cited

U.S. PATENT DOCUMENTS

| 2,807,074 | 9/1957 | Schroeder ...................... 228/261 X |
| 3,456,331 | 7/1969 | Holden .............................. 228/183 |
| 3,531,340 | 9/1970 | Bunshah et al. .................. 228/208 |
| 3,680,762 | 8/1972 | Kondo ............................ 228/207 X |

Primary Examiner—Donald G. Kelly
Assistant Examiner—K. J. Ramsey
Attorney, Agent, or Firm—Browdy and Neimark

[57] ABSTRACT

The machine comprises an endless guiding path for mobile supports equally spaced by a distance smaller than the length of the smallest heat exchanger to be brazed. The supports have protruding portions cooperating with the bottom on the same side of the end plates of the heat exchangers.

10 Claims, 4 Drawing Figures

APPARATUS FOR BRAZING END PLATES AND THE LIKE

FIELD OF THE INVENTION

The present invention relates to the manufacture of heat exchangers and more particularly to the brazing of the end plates on the ends of the tubes of heat exchanger cores.

BACKGROUND OF THE INVENTION

There are of course a great many heat exchangers manufactured and, more particularly if we consider the manufacture of the heat radiators for motor vehicles, the height of the heat exchangers, i.e. the length of the tubes connecting together the two end plates, vary greatly from one type to the other. It is a similar situation with respect to the length of the end plates and, also, but to a smaller extent, with the thickness of the heat exchangers as well as also the width of their end plates.

SUMMARY OF THE INVENTION

The present invention results from the fact that in a manufacturing line several types of heat exchangers must be worked simultaneously because some of the working steps can be performed in a short time, and it is of course important that those steps be performed by machines operating in a continuous way for obvious saving of cost.

The present invention then relates to a machine permitting the brazing of the end plates onto the tubes whatever be the size of the heat exchangers, and consequently enabling these exchangers always to be brought in a correct position to the successive working stations, especially at the brazing station.

According to the invention the polyvalent machine for brazing end plates and the like onto tubes of heat exchangers comprises an endless guiding path for equidistant mobile supports spaced from each other by a distance smaller than the length of the smallest heat exchanger to be brazed, these supports having protruding portions cooperating with the bottom on the same side of the end plates of the heat exchangers, whereby all the heat exchangers are laterally placed relatively to the guiding path with one of the end plates thereof in a same horizontal plane and are brought by said supports to the various working stations fixedly placed along the guiding path.

Various other features of the invention are moreover shown in the following detailed description.

BRIEF DESCRIPTION OF THE DRAWINGS

An embodiment of the invention is shown by way of nonrestrictive example in the accompanying drawings.

DESCRIPTION OF PREFERRED EMBODIMENTS

Figure 4:
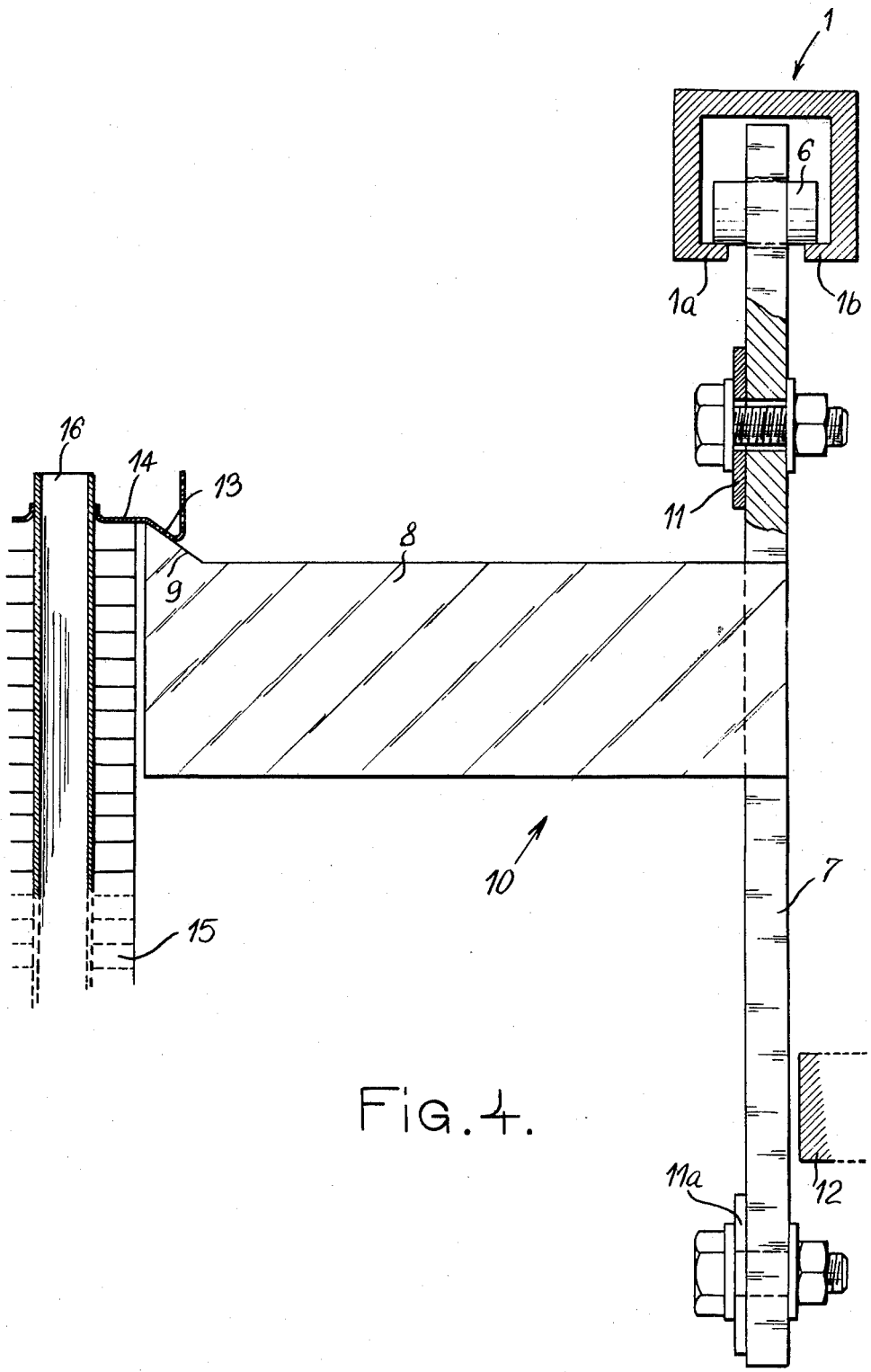
FIG. 4 is an enlarged cross-sectional view taken substantially along line IV—IV of FIG. 3.

The machine illustrated in the drawings comprises a guiding path 1 with two rectilinear arms 2, 3 connected together by curved portions 4, 5. The guiding path 1 is constituted by a metallic section having a C-shape whose opening is turned downwards and which has inner wings $1a$, $1b$ (FIG. 4). The guiding path 1 comprises supporting axles 6 for bars 7 onto which lugs 8 are fixedly mounted, as by welding; the lugs 8 have an upper edge ending with a protruding portion or encasing nose 9. All the lugs 8 are directed in the same direction.

The bars 7 and lugs 8 unit constitutes a heat exchanger support and a plurality of similar supports 10 are equally spaced along the guiding path 1. The supports 10 are connected together by endless strips 11, $11a$ for example constituted by chains, cables or metal sheets as shown in the drawings. The distance separating two supports 10 is smaller than the length of the smallest heat exchanger which has to be brazed.

FIG. 4 shows that a rail 12 is designed to constitute a bearing preventing rocking of the supports 10. The protruding portions 9 of the supports 10 form retaining holders when encased by the lateral edge 13 of the end plates 14 of the heat exchangers 15 whose tubes 16 are to be brazed with the end plates 14.

Figure 1:
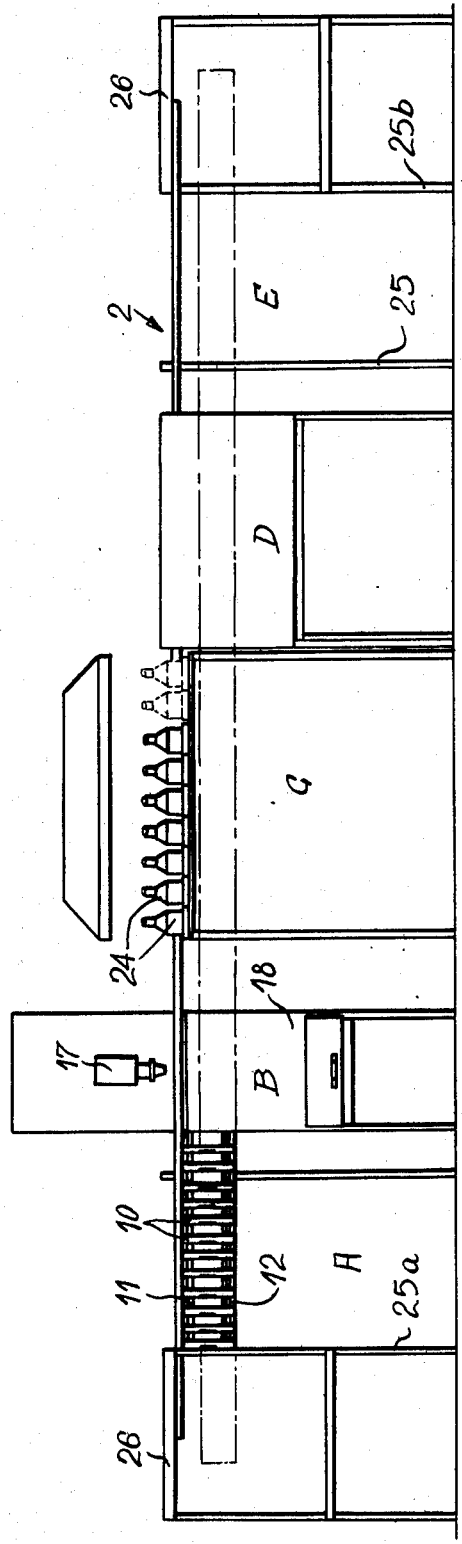
FIG. 1 is a diagrammatic side elevational view of the brazing machine of the invention.
Figure 2:
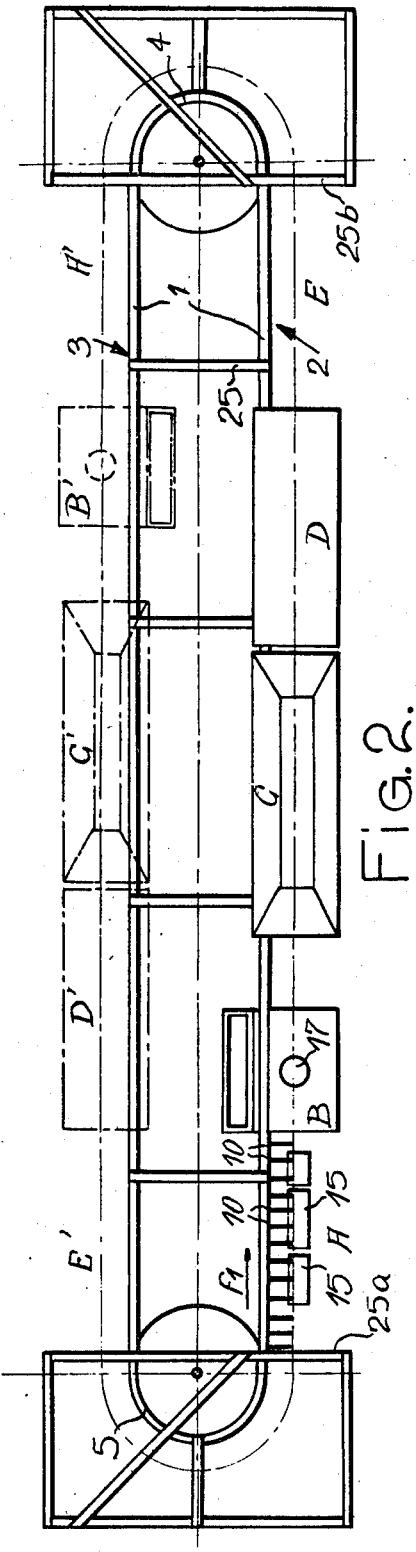
FIG. 2 is a diagrammatic plan view corresponding to FIG. 1.
Figure 3:
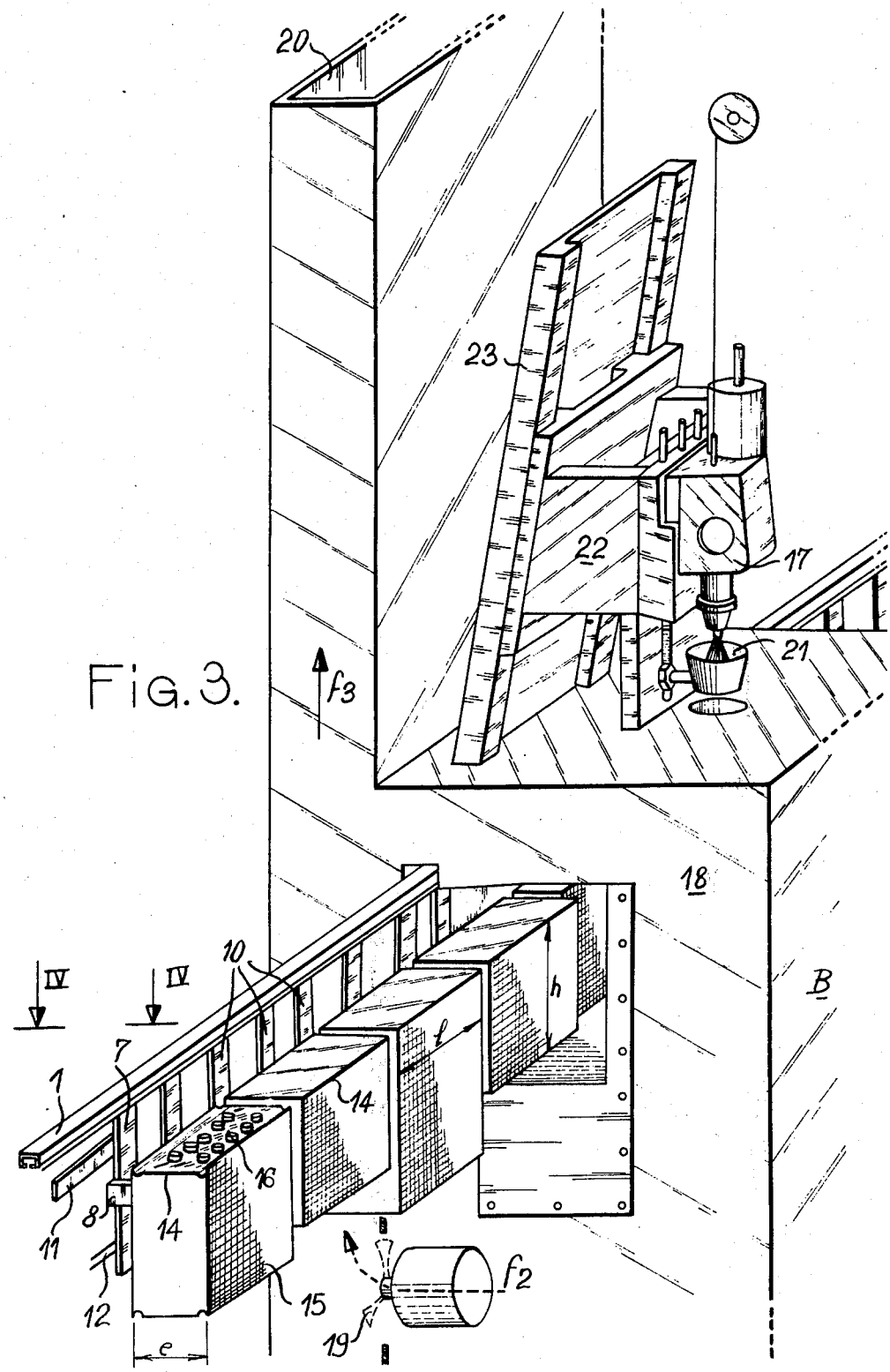
FIG. 3 is a partial perspective view of the machine of the preceding figures.

FIG. 3 shows that heat exchangers 15 can be placed to be respectively in mutual contact without practically any clearance between them. Besides, this can be obtained whatever be the length $l$ of the heat exchangers, and FIG. 3 shows, also, that the end plates 14 on one side of the heat exchanger are also, all placed at a same level whatever be the height $h$ of the heat exchangers.

As appears from the above disclosure, the heat exchangers 15 are advantageously placed manually on the supports 10 at a loading station A provided at the beginning of the arm 2 when considering a direction of passage according to arrow $f_1$.

A first working station B is placed on the arm 2, this working station comprising at least a metallizing gun 17 placed on the top of an area 18 crossed through by the guiding path 1.

FIG. 3 diagrammatically shows that the area 18 contains an aspiration means, for example a fan 19 placed to establish an air circulation from top to bottom inside the area 18 as shown by arrow $f_2$, the air being then pushed back in an air-shaft 20 according to arrow $f_3$.

Operating the fan 19 in this manner creates a draught in the area 18 which does not trouble the operation of the metallizing gun 17 which sprays the brazing material through a cone-shaped tube 21 onto the end plates 14 of the heat exchangers 15. Care is also taken that the gases, vapors and lead particles, produced by the operation of the metallizing gun, be suitably evacuated without any risk to the premises in which the machine is placed, which is especially important when the metallizing gun 17 sprays brazing alloys with a lead base.

Though not necessary in all cases, it is advantageous that the metallizing gun 17 be supported by a carriage 22 which can be moved along a guiding line oblique relative to the plate 23. This arrangement permits the adjustment of the position of the gun 17 depending on the thickness $e$ of the heat exchangers to be treated. In that case, means are provided to adjust the rate of feeding the brazing material to the metallizing gun.

When coming out from the area 18, the heat exchangers pass under the infrared ray heating lamps 24 which are at a fixed position, since the end plates 14 of the heat exchangers are all at the same level whatever be their respective sizes.

The heating lamps 24 constitute a brazing station C in which the brazing material deposited to the station B is melted to fill the joints existing between the tubes 16 and the end plates 14 and promote brazing.

Upon coming out from the station C, the heat exchangers are conveyed to a station D where they are cooled by air blowing. They are then unloaded at E at the end of the arm 2.

It is advantageous that frame 25 supporting the guiding path 1 forms at its ends two tables 25a, 25b whose tops delimit fluxing tanks 26 of a small height. In this manner that portion of the end plates 14 having to be brazed to the tubes 16 can be fluxed by dip-fluxing in the tank 26 of the table 25a.

The arm 3 of the guiding path can be constructed in the same way as the arm 2 to proceed for example to the brazing of the second end plate after turning over at the unloading station E and fluxing in the tank 26 of the table 25b. In that case, the heat exchangers are once more placed on the supports 10 at a station A', then submitted to a metallization covering at a station B' and brazed at a station C', and cooled at a station D' and lastly unloaded at a station E'.

The upper portion of the tables 25a and 25b being positioned above the guiding path 2, it is also possible, in a modification of the invention not shown, that the top of these tables can be used for the passage of a conveyor for respectively bringing and removing the heat exchangers to be worked and their fluxing will be performed with a gun or other means.

As it appears from the above disclosure, the heat exchangers 15 being supported directly by the end plates 14 which have to be worked, the end plates are always at a proper distance as well from the metallizing gun 17 as from the heating lamps 24 or other working machine making up the working device, and whatever be the height h or the length l of the heat exchangers.

Placing or removal of the heat exchangers is, in addition, extremely easy, since the lugs 8 of the supports automatically project under the end plates 14. Moreover, when heat exchangers are to be treated having a thickness c greater or, on the contrary, smaller, the position of the metallizing gun 17 can easily be adjusted by moving the corresponding supporting carrier 22 along the oblique plate 23 while permitting the head of the metallizing gun always to be in a position for which it is lined up with the longitudinal axis of the end plate of the heat exchangers to be metallized. The motion of the metallization head can, besides, and if desired, be easily controlled by a servo-mechanism comprising a captor component detecting the type of heat exchanger to be worked and, consequently, its thickness e. The brazing alloy flow from the gun is then correlatively adjusted.

The invention is not restricted to the embodiment shown and described in detail, since various modifications thereof can moreover be applied thereto without departing from the scope of the invention as shown in the appended claims. Especially, the guiding path can have another shape than the oblong form shown in the drawings.

I claim:

1. An apparatus for brazing of end plates and the like onto tubes of variable sized heat exchangers having a plurality of work stations, said apparatus including a brazing station and conveyor means comprising endless guiding means at least in part extending in a horizontal path, a plurality of upright support bars movably carried by said guiding means and connected together for common motion along said guiding means, each of said support bars carrying fitting means, the fitting means of adjacent support bars being adapted to engage the bottom side of the end plate of a given heat exchanger and each of said fitting means being disposed at a common height on said support bars whereby each of said heat exchangers may be successively conveyed through the brazing station with the uppermost end plates all arranged in a common horizontal plane to facilitate the brazing thereof.

2. An apparatus as set forth in claim 1, wherein said fitting means comprise a laterally protruding lug having at the outer tip an upwardly directed catch.

3. An apparatus as set forth in claim 1, wherein each of said fitting means comprises a laterally protruding lug carried by a respective one of said support bars and having at the outer tip an upwardly directed catch, the lugs of said adjacent bars being adapted to engage the bottom side of the end plate of a given heat exchanger and each of said lugs being disposed at a common height on said support bars.

4. An apparatus as set forth in claim 1, wherein said guiding means is defined by two rectilinear arms, whereby the heat exchangers carried on said support bars are placed one against the other.

5. An apparatus as set forth in claim 4, wherein said work stations comprise at least one loading station at the beginning of one of said rectilinear arms, then a metallization station and a brazing station immediately next to said metallization station.

6. Machine as set forth in claim 5, wherein said brazing station comprises fixed heaters of the radiant type.

7. Machine as set forth in claim 5, wherein said metallization station further comprises an area crossed by the endless guiding means which is evacuated by an aspiration means.

8. Machine as set forth in claim 5, wherein said metallization station further comprises means for adjustably positioning a metallizing gun.

9. Machine as set forth in claim 8, wherein said means for adjustably positioning said metallizing gun comprises a carriage, mounted on an oblique plate so that movement of said carriage along said oblique plate adjusts the position of said metallizing gun so that the head thereof is brought into concidence with the longitudinal axis of the end plates to be metallized regardless of the size thereof.

10. Machine as set forth in claim 1, wherein the ends of the endless guiding means are supported by frames forming tables for the support of accessories.

* * * * *